June 19, 1951 C. W. WALZ ET AL 2,557,711
BEET TOPPER WITH TOP CLEANING MEANS
Filed Oct. 11, 1946 3 Sheets-Sheet 1

INVENTORS
CLAUDE W. WALZ & HOWARD F. CLAUSEN
ATTORNEYS

June 19, 1951 C. W. WALZ ET AL 2,557,711
BEET TOPPER WITH TOP CLEANING MEANS
Filed Oct. 11, 1946 3 Sheets-Sheet 3

INVENTORS
CLAUDE W. WALZ & HOWARD F. CLAUSEN
BY
ATTORNEYS

Patented June 19, 1951

2,557,711

UNITED STATES PATENT OFFICE 2,557,711

BEET TOPPER WITH TOP CLEANING MEANS

Claude W. Walz, Rock Island, and Howard F. Clausen, Moline, Ill., assignors to Deere & Company, Moline, Ill., a corporation of Illinois Application October 11, 1946, Serial No. 702,761

1 Claim. (Cl. 56—121.44)

The present invention relates generally to agricultural implements and more particularly to machines for harvesting sugar beets and the like.

The object and general nature of the present invention is the provision of a new and improved harvester wherein means is provided for cleaning off the upper cut portions of the topped beets after the passage of the topping means and other associated units so that the row of topped beets is clearly visible to the operator of a subsequent machine. The present invention is particularly applicable to beet harvesting apparatus which includes, as one machine, a topping unit, which generally is of such construction as to top the beets from two or more rows of beets at the same time, and a separate or subsequently operable machine for digging or pulling the beets from the two or more rows of beets already topped. It has been found that if the second machine is not used until a few hours after the beets have been topped there is some tendency for the exposed upper portions of the topped beets to darken in color and also to be covered by soil, trash and the like so that the operator of the second machine may under certain conditions have difficulty in following the rows of beets, resulting in improper operation of the pulling or digging apparatus. With the use of the present invention, the upper portions of the topped beets are cleared of trash, adhering soil and the like and may therefore be seen easily and conveniently by the operator of the second machine.

The present invention is especially applicable to machines wherein chisels or other soil working tools are used rearwardly of the topping apparatus for loosening the ground about the topped beets thereby to facilitate the subsequent operation of pulling or digging the topped beets. The action of such chisels or other soil working tools may result in throwing considerable quantities of soil onto the upper exposed portions of the topped beets, making it extremely difficult for the operator of the subsequent machine to follow the row, unless some means equivalent to the present invention is employed for cleaning off the cut ends of the beets so as to make them easily and conveniently visible.

Another feature of this invention is the provision of beet cleaning means which is especially adapted to be used with vertically shiftable topping means so that the upper ends of the topped beets are cleared of adhering soil, trash and the like, irrespective of whether the beet is topped low or high.

These and other objects and advantages of the present invention will be apparent to those skilled in the art after a consideration of the following detailed description, taken in conjunction with the accompanying drawings, in which:

Figure 3 is a view taken generally along the line 3—3 of Figure 1;

Figure 1:
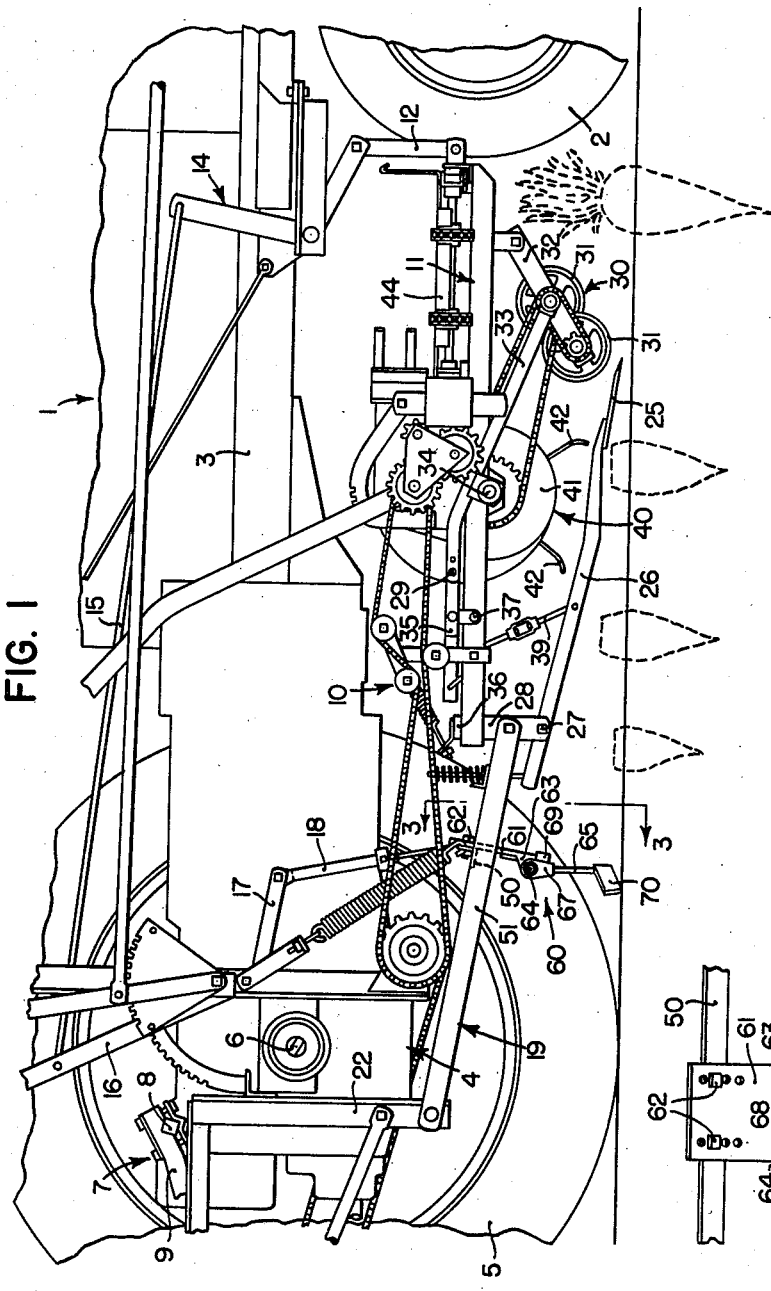
Figure 1 is a side view of a beet harvester incorporating the principles of the present invention.
Figure 2:
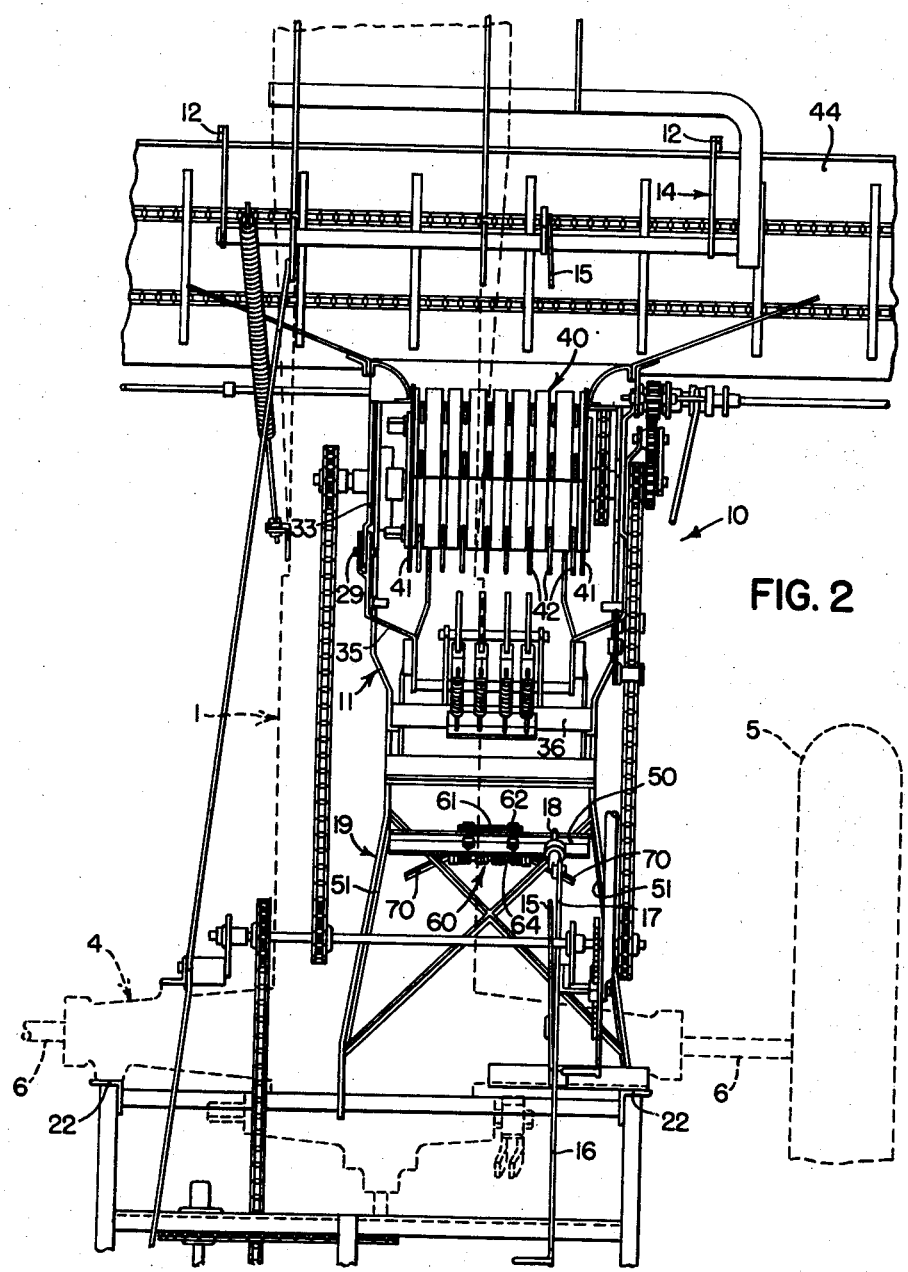
Figure 2 is a plan view of the beet harvester shown in Figure 1.

Referring now to the drawings, more particularly to Figures 1–3, the beet harvester of the present invention is shown as mounted on a tractor 1 of more or less conventional construction, embodying front wheels 2, a narrow elongated supporting frame 3 and a rear axle structure 4 which includes rear wheels 5 mounted on axle shafts 6 journaled for rotation in lateral extensions that form a part of the rear axle structure 4. The tractor 1 preferably is equipped with a power lift unit 7 having a rockshaft 8 and a lift arm 9. The topping unit is indicated in its entirety by the reference numeral 10 and comprises, in general, a topping frame 11 mounted for generally vertical movement relative to the tractor 1 and preferably suspended therefrom by suitable vertically adjustable link means 12 pivotally connected at their lower ends to the frame 11 and at their upper ends to a bell crank 14 mounted for rocking movement on the tractor and controlled by one or more links 15 extending rearwardly from the bell crank 14 to a raising and lowering lever 16. The latter includes an extension 17 that is connected by a link 18 with a rear portion of the topping frame 11 through a push frame 19 that is pivotally connected at its front end with the topping frame 11 and at its rear end with suitable brackets in the form of angles 22 bolted or otherwise connected to the rear axle of the tractor. The topping unit 10 also includes a topping knife 25 that is fixed to a pair of arms 26 which are pivoted, as at 27, to a bracket 28 that forms a part of the topping frame 11. The topping knife 25 may be raised and lowered by means of a finder unit 30 which includes beet-contacting wheels 31 mounted on a support 32 that is connected to raise and lower the knife through a pair of arms 33 which are pivotally connected, as at 34, to the topping frame 11 and which have their rear ends pivoted, as at 29, to a second pair of levers 35 swingably and pivotally mounted, as at 37, on the topping frame 11. The rear ends of the levers 35 are connected to the knife arms 26 through downwardly extending adjustable links 39. The cut tops are removed from the knife 25 and knife arms 26 by pickup mechanism 40 which includes a rotatable drum 41 having top engaging fingers 42 which engage the tops, sweep them rearwardly and upwardly, and then forwardly, alternately depositing them onto a top conveyor 44.

The beet harvester structure just described is largely conventional, so far as the present invention is concerned. For the larger acreages, it has been proposed to provide a machine such as that described above with two topping units 10 for removing the tops from two rows of beets at the same time. It is obvious, of course, that more than two topping units may be used if desired. After the beets have thus been topped, the operation of the topping machine is followed by a subsequent operation of another machine which includes beet lifting apparatus constructed and arranged to lift the topped beets from the two or more rows topped by the machine described above. It has been found, however, in this type of operation that if too great a time elapses between the operation of the first and second machine, the upper or cut ends of the topped beets are not readily visible to the operator of the second machine, and hence, not knowing exactly where the row of beets is, he sometimes fails to properly guide his second machine. Frequently, dust, soil, and the like are thrown up onto the cut upper ends of the beets by the operation of the apparatus, particularly the crop-engaging fingers which may shake dust, trash, and the like down onto the cut ends of the topped beets, and for this reason, as well as other reasons, it sometimes becomes quite difficult for the operator of the second machine to hold the latter on the row or rows.

According to the principles of the present invention, means is provided for cleaning off the upper cut portions of the topped beets so that the operator of the second machine can easily see the topped beets, and such beet cleaning means will now be described.

The push frame 19 of the topping unit 10 carries an angle 50 that extends from one side arm 51 of the frame 19 to the other side arm 51 thereof, the angle 50 preferably being the angle that receives the lower end of the link 18. A beet cleaning unit is indicated in its entirety by the reference numeral 60 and comprises a bracket 61 that is adapted to be secured, as by bolts 62, to the angle 50. The lower end of the bracket 61 is provided with a pair of apertured arm extensions 63 in which a tubular shaft 64 is disposed. A beet engaging plate 65 is fixed, as by welding, to a pair of lateral ears 67 that are apertured and which receive the tubular shaft 64. Any suitable means may be provided for holding the latter in position. A coil spring 68 is disposed about the shaft 64 and urges the blade 65 forwardly. The forward swinging movement of the blade 65 is limited by the provision of a stop 69 on one of the arms 63 which cooperates with one of the ears 67 to limit the forward movement of the blade 65. The latter member, where necessary, may be provided with a transverse extension bar 70 to increase the effectiveness of the blade. The bracket 61 may be provided with several sets of holes to receive the attaching bolts 62 so that the vertical position of the blade 65 may be adjusted as necessary.

In operation, referring to Figure 1, the finder unit 30 passes over the beets and raises or lowers the knife 25 according to whether the finder 31 engages the larger or a smaller beet, it being understood that generally the larger beets project outwardly from the ground surface a farther distance from the shorter or smaller beets. The brackets 61 is attached to the angle 50 so that the lower portion of the blade 65 and/or the extension 70 thereof is in a sufficiently low down position to engage and scrape all adhering soil, trash and the like from the upper exposed or cut ends of each of the beets, whether they be small beets cut near the ground surface or the larger beets that are cut a considerable distance above the surface of the ground. For the taller or larger beets, the blade 65 swings rearwardly against the action of the spring 68, the latter being of sufficient strength to hold the blade 65 down against the beet with a force adequate to clear the upper cut end of the larger beets of trash, adhering soil and the like, but the spring 68 is not sufficiently strong to break or knock over the larger beets.

Figure 4:
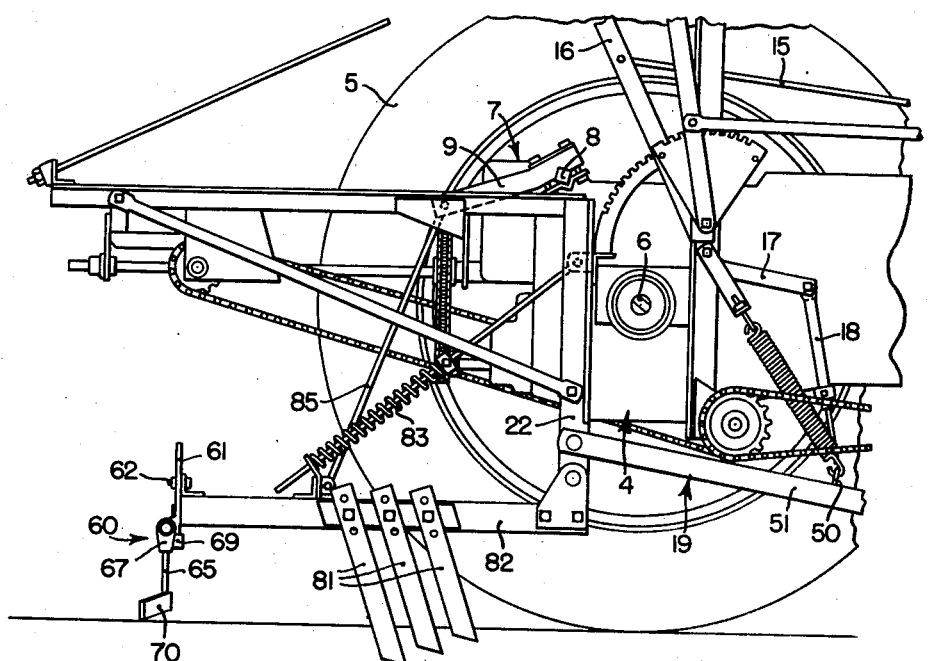
Figure 4 is a view similar to Figure 1, showing a modified form of the present invention.

A modified form of the present invention is shown in Figure 4. In this form of the invention a plurality of chisels 81 are fixed to a chisel frame 82 that is pivotally connected to the tractor 1, preferably to the lower ends of the attaching brackets 22. Suitable spring means 83 is provided for holding the frame 82 in a downward position, and the frame 82 is raised by a connection 85 to the tractor power lift arm 9, or to some other control on the tractor. The purpose of the chisels 81 is to loosen the ground around the topped beets so as to make the operation of the subsequent pulling or lifting machine somewhat easier. In the use of such chisels 81, however, the loosened soil tends to be thrown over on to the upper exposed ends of the beets, and hence the provision of the beet cleaner 60 following the chisels 81 is of special importance. The beet cleaning unit 60 may, therefore, be readily fastened to the rear end of the chisel frame 82 and, as explained above in detail, function to scrape away from the cut beets all adhering soil, trash, and the like. The parts of the beet cleaner 60 shown in Figure 4 are the same as those described above in detail in connection with the beet cleaner shown in Figure 1, and hence the description is believed to be unnecessary.

Figure 5:
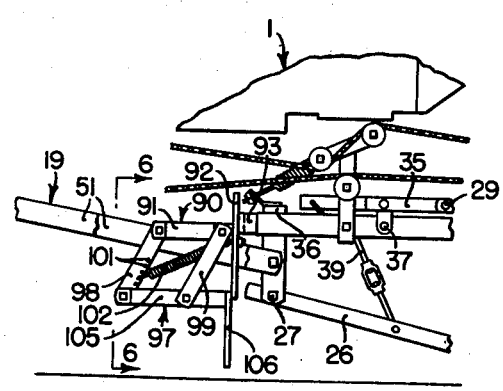
Figure 5 is a fragmentary side view showing another modified form of the present invention.
Figure 6:
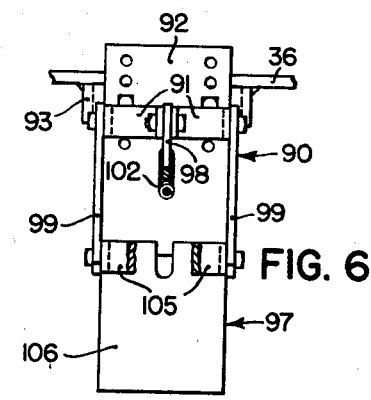
Figure 6 is a rear view, looking forwardly, of the topped beet scraper mounting structure shown in Figure 5, Figure 6 being a view taken generally along the line 6—6 of Figure 5.
Figure 7:
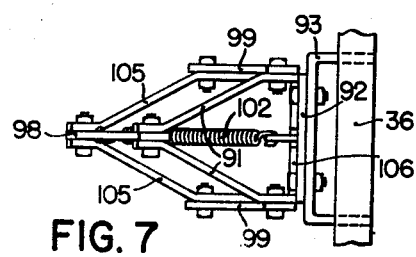
Figure 7 is a top or plan view of the scraper mounting shown in Figures 5 and 6.

Figure 5, 6 and 7 show another modified form of the present invention wherein the beet engaging plate or scraper is mounted for generally vertical parallel movement relative to the topping frame by means of parallel links. Referring now to Figures 5, 6 and 7, the reference numeral 90 indicates the scraper adjusting plate assembly which comprises a pair of rearwardly converging arms 91 that are fixed, as by welding, at their forward ends to a flat plate 92 having a plurality of vertically spaced bolt holes receiving fastening bolts by which the plates and associated parts may be fixed to a bracket 93 secured in any suitable way to the cross bar 36 of the topping frame 11. The vertical position of the plate 92 may be varied by placing the attaching bolts in different holes in the plate 92. A scraper blade assembly 97 is swingably connected with the supporting bracket structure 90 by means of generally fore and aft swinging parallel links 98 and 99, the upper end of each of which is pivotally connected to the supporting bracket structure 90. The rearmost link 98 is provided with a plurality of apertures 101 which receive the rear end of a spring 102, the front end of which is connected in any suitable manner to the plate 92. The lower end of each of the links 98 and 99 is pivotally connected to the rearwardly converging arms 105 of a scraper blade assembly, which includes a scraper blade 106 fixed, as by welding, to the forward ends of the rearwardly converging bars 105. The blade 106 includes a central recessed portion 107 which is provided to accommodate the springs 102 when the scraper plate 106 is swung rearwardly and upwardly, as when passing over the higher beets. The construction just described has one advantage over the constructions previously described in that the scraper blade 106 moves in generally parallel positions and always remains vertical. The tension of the spring 102 can be adjusted, either by adjusting the eye bolt which connects the front end of the spring 102 to the plate 22 or by placing the rear end of the spring 102 in a different opening in the rear bar or link 98.

While we have shown and described above the preferred structure in which the principles of the present invention have been incorporated, it is to be understood that our invention is not to be limited to the particular details shown and described above, but that, in fact, widely different means may be employed in the practice of the broader aspects of our invention.

What we claim, therefore, and desire to secure by Letters Patent is.

In a beet harvester, a support, a generally vertically adjustable topping means carried by said support, and means for raising and lowering the topping means for removing the tops from both large and small beets, the improvement comprising a beet top-engaging means adapted to clean the upper portions of the topped beets, said beet top-engaging means comprising a bracket normally disposed in a generally transverse vertical position, a beet-engaging plate hingedly connected to the lower portion of said bracket, a pair of generally laterally outwardly extending beet-engaging portions carried at the lower portion of said plate and swingable therewith relative to said bracket, and means for connecting said bracket with said support in such position that the lower edge of said plate and said laterally extending portions are adapted to engage and clean off the upper cut ends of the smaller and lower beets and also the upper cut ends of the larger and higher beets.

CLAUDE W. WALZ.
HOWARD F. CLAUSEN.

REFERENCES CITED

The following references are of record in the file of this patent:

UNITED STATES PATENTS

| Number | Name | Date |
| --- | --- | --- |
| 815,325 | Arthur | Mar. 20, 1906 |
| 842,021 | Sandberg | Jan. 22, 1907 |
| 865,885 | Gudmunsen | Sept. 10, 1907 |
| 882,465 | Hanna | Mar. 17, 1908 |
| 896,557 | Lesh et al. | Aug. 18, 1908 |
| 908,254 | Hanna | Dec. 29, 1908 |
| 1,135,988 | Blevins et al. | Apr. 20, 1915 |
| 1,878,349 | Terada | Sept. 20, 1932 |
| 2,337,698 | Walz | Dec. 28, 1943 |